D. MARTIN.
HORSE HAY-RAKE.
No. 191,161.    Patented May 22, 1877.
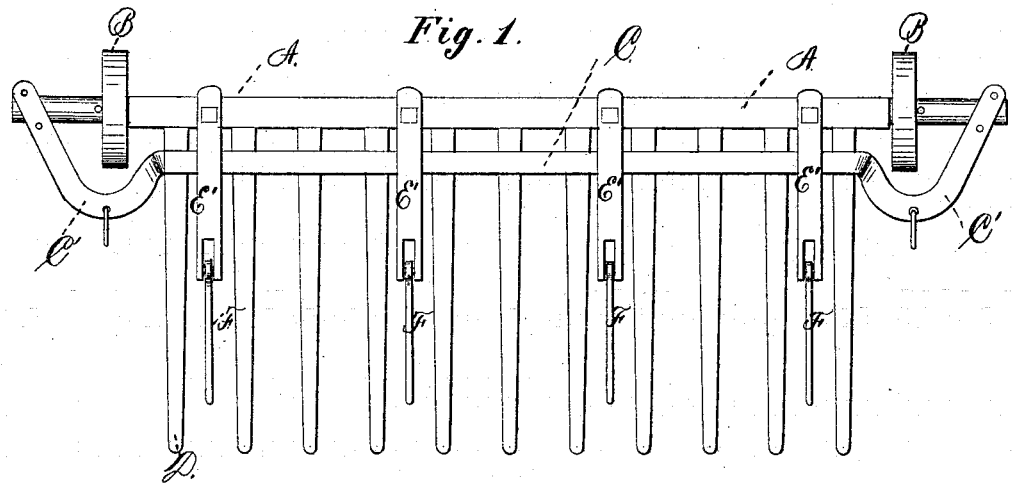
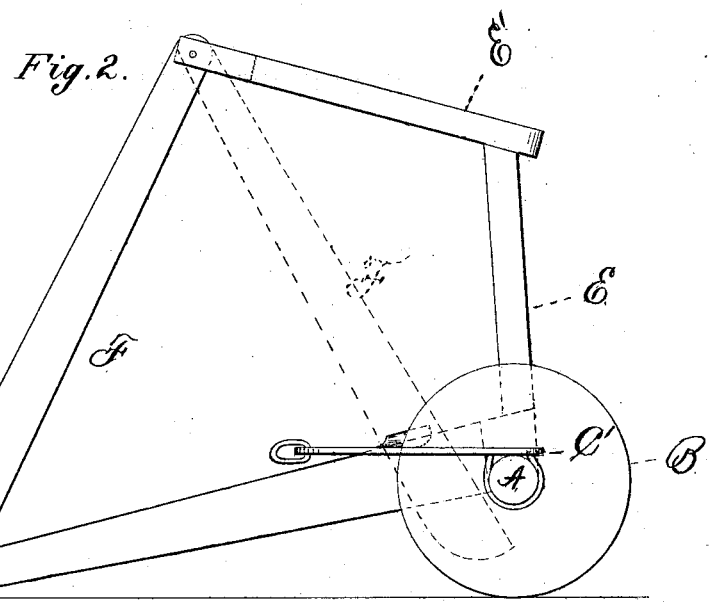
WITNESSES:
H. T. Miscall
Jno. P. Jacobs
David Martin
INVENTOR.
J. McC. Perkins
ATTORNEY.

UNITED STATES PATENT OFFICE.

DAVID MARTIN, OF BROOKSTON, INDIANA.

IMPROVEMENT IN HORSE HAY-RAKES.

Specification forming part of Letters Patent No. 191,161, dated May 22, 1877; application filed April 4, 1877.

*To all whom it may concern:*

Be it known that I, DAVID MARTIN, of Brookston, in the county of White and State of Indiana, have invented certain new and useful Improvements in Horse Hay-Rakes; and I do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claims.

Figure I is a plan view embodying my invention. Fig. II is an end view of same.

The object of my invention is to furnish a simple and durable rake for gathering the hay together convenient to the stack or mow, and also to avoid delay in unloading the rake and to prevent the clogging of the wheels.

A is the rake-head, the ends of which project beyond the wheels, as shown in Fig. I. B B are the wheels. C is the iron bar, to which the teeth of the rake and the ends of the axle are riveted or otherwise firmly secured. D D, &c., are the teeth. E E are the uprights mortised in the axle, and prevent the load on the rake from sliding off. These uprights have a rigid arm, E' E', to each of which is affixed the jointed arm or stripper F.

The rake may be made of any desired length, preferably about sixteen feet, with teeth about seven feet in length and fifteen inches apart.

The iron bar C is bent at C' around the wheel B at each end of the rake-head, as shown in Fig. I, and prevents the hay from clogging the wheels; it also adds strength and stability to the rake. In front of each wheel is a ring in the bar C for the insertion of a clevis or other means of hitching the draft animal to each end.

When the rake is loaded and drawn to the stack or barn, it is unloaded by simply reversing the motion. The free arms or strippers F take hold in the ground and so push the hay off the teeth, which might otherwise hold by reason of close packing between the teeth. The dotted lines, Fig. II, show the position of the arms F before unloading the fork. The other shows the position after reversal and unloading.

Having thus described my invention, I claim—

1. The wheel-guard, formed by the bend C' in the bar C, as and for the purpose shown and described.

2. The rake-head A, supported by wheels B, uprights E, having arms E' and strippers F, as and for the purpose described and shown.

3. The rake-head A, supported by wheels B and teeth D, strengthened by the bar C, having the bend C', upright E having the rigid arms E' and strippers F, arranged and combined and operated as shown and described, and for the purpose specified.

In testimony that I claim the foregoing I have hereunto set my hand this 12th day of February, 1877.

DAVID MARTIN.

Witnesses:
 JAMES N. ZIED,
 JOHN CUNNINGHAM.